April 16, 1940. C. A. CAMPBELL 2,196,976
SANDER
Filed Aug. 8, 1936 2 Sheets-Sheet 2
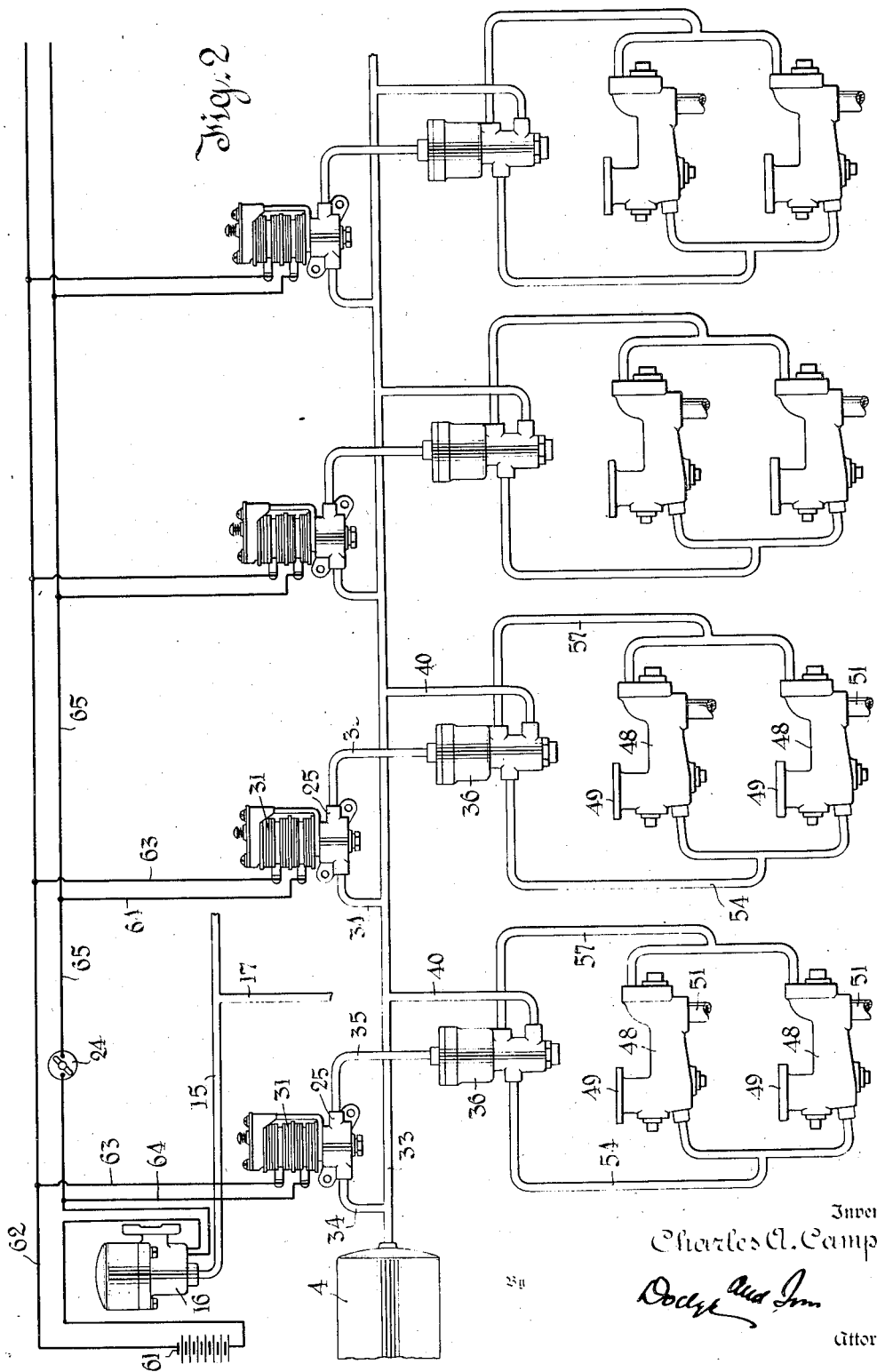
Inventor
Charles A. Campbell
Dodge and Son
Attorneys Patented Apr. 16, 1940

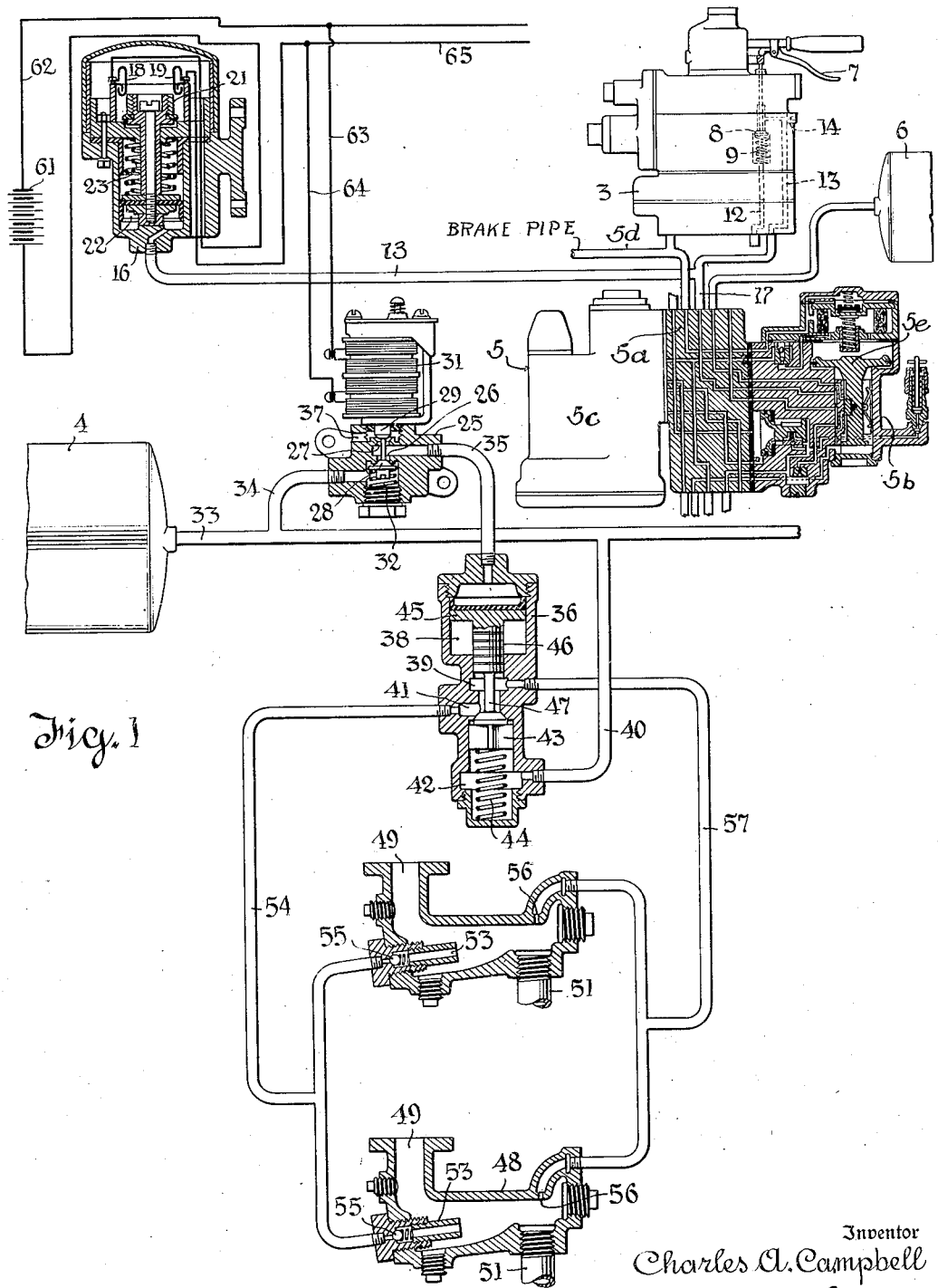

2,196,976

UNITED STATES PATENT OFFICE 2,196,976

SANDER

Charles A. Campbell, Watertown, N. Y., assignor to The New York Air Brake Company, a corporation of New Jersey Application August 8, 1936, Serial No. 95,008

6 Claims. (Cl. 291—15)

This invention relates to fluid pressure brake systems and particularly to means for operating the sanding equipment employed in brake systems such as schedule H. S. C.

In high speed train service, during a brake application, brake cylinder pressure is very rapidly developed throughout the train. Because of this it is of utmost importance that the sanding operation be effected promptly and synchronously throughout the system.

It should occur at least simultaneously with and preferably in advance of the actual brake application. Failures to do so may be of serious consequence.

In trains of the above type the sanding valves are usually actuated during service applications by means of a manually operable valve, commonly a pinch handle valve on the engineer's brake valve.

In an emergency application with schedule H. S. C. the sander valves are automatically actuated by the triple valve portion of the control valve one of which is associated with the brake cylinders for each of the various trucks. This control valve locally controls flow of pressure to and from the brake cylinders. The well known No. 21 control valve will be used as typical in the following description.

In accordance with this invention the engineer's brake valve pinch handle, or equivalent manually operable valve, is utilized during service applications to initiate the operation of electro-pneumatic means to cause sanding.

During an emergency application initiated by a reduction of brake pipe pressure at an emergency rate, the control valve on the leading truck connects a small (sanding) reservoir with the sander control pipe, and sanding then is continuous until the reservoir is vented through a timing choke in the sander control pipe, unless the emergency application is sooner terminated.

If desired, the electro-pneumatic means can be rendered partially inoperative, i. e., certain magnet valves may be cut out. Under these circumstances sanding will occur upon the leading truck only. This becomes desirable when rail conditions are favorable, as it is then necessary to sand from one point only, whereas under adverse rail conditions, all sanding points should be active.

One embodiment of the invention is illustrated in the accompanying drawings in which—

Fig. 1 is a diagrammatic view including the necessary sanding equipment for one truck of a car, showing the related units of a fluid pressure brake system.

Fig. 2 is a similar view omitting the engineer's brake valve and the control valve and showing the sanding equipment for the first and second trucks of each of the two motor units used with long trains.

Referring first to Fig. 1 the numeral 3 designates an engineer's brake valve, 4 the main reservoir, 5 the control valve for the brakes of the first motor truck of the train; and 6 the sanding reservoir connected with this control valve. These elements are standard equipment in fluid pressure brake systems (schedule H. S. C.). In this case the sanding reservoir is included in only one brake unit. In Fig. 1 the control valve 5 is shown as made up of a ported pipe bracket 5a, a triple valve portion 5b, and a relay valve portion 5c. The triple valve portion is shown in release position in which it charges the reservoir 6 from brake pipe 5d through the usual charging groove around the triple piston 5e and a charging port in the triple slide valve. When the triple piston 5e moves all the way up to emergency position a cavity in the triple slide valve connects reservoir 6 with pipe 17.

The engineer's brake valve includes a pinch handle 7 for unseating a poppet valve 8 urged to its seat by a spring 9. The poppet valve 8 controls flow of fluid pressure from a pipe 11 (connected with the main reservoir) through passage 12 to passage 13. An exhaust or timing choke fitting 14 is provided and leads from passage 13 for a purpose to be described.

A pipe 15 connects the passage 13 to a normally open pressure switch 16. A branch 17 of pipe 15 is connected to the sander port of the control valve bracket 5a.

It follows from the above that movement of the pinch handle 7 to unseat the poppet valve 8, or movement of the slide valve of the triple portion of the control valve to emergency position will admit fluid pressure to pipe 15, thus causing closure of pressure switch 16.

Pressure switch 16 includes two contacts 18 and 19, a contactor 21, and a piston 22, normally held in its lower position by springs 23. When fluid pressure is admitted to the space below piston 22 this piston will move upward against the resistance of springs 23. Contactor 21 which partakes of the movements of piston 22 will engage contacts 18 and 19 and close the electric circuit about to be described.

From a source conventionally illustrated as a battery 61 lead two lines 62, 65, the latter including the contacts 18 and 19 and contactor 21 of switch 16. A plurality of magnet valves 25 have their windings connected in parallel between lines 62, 65, by means of branch wires 63, 64. A switch 24 (Fig. 2) when open cuts out all magnet valves located beyond it. As shown it cuts out the rear three of the four magnet valves illustrated. Obviously the switch can be located so as to cut out one, two or three units or a plurality of switches might be used to cut out any desired number of magnet valves.

Each magnet valve 25 has a supply port 26 and an exhaust port 27 controlled by valves 28 and 29, respectively. When windings 31 of the magnet valve are energized, valves 28 and 29 are forced downward against the resistance of spring 32. Exhaust port 27 will close, and supply port 26 will open. Fluid pressure may then flow from main reservoir 4 by way of pipe 33, branch pipe 34, supply port 26 and pipe 35 to the sander valve 36. When the windings are deenergized, spring 32 moves the valves 28 and 29 upward to close supply port 26, open exhaust port 27, and exhaust fluid pressure from the sander valve 36 through atmospheric exhaust port 37.

The sander valve 36 comprises a body having a cylinder 38 and three chambers 39, 41 and 42. Chamber 42 is open to main reservoir pressure at all times through pipe 40 connecting it with pipe 33. A poppet valve 43, normally held to its seat by a spring 44, controls flow of fluid pressure from the chamber 42 to chamber 41. A piston 45 having a second piston 46 of smaller diameter formed as an extension thereof works in cylinder 38. A stem 47 of piston 46 engages poppet valve 43 and unseats it upon downward motion of the piston.

The sander valve 36 serves one or more sand traps 48. They are alike in structure and function so only one need be considered. They are connected at 49 with a source of sand (not shown) and are provided with a discharge pipe 51 which directs the discharged sand upon the rails. A nozzle 53 threaded into the trap body is connected with the chamber 41 of the sander valve 36 by a supply pipe 54. Flow of fluid pressure through nozzle 53 is controlled by a spring loaded ball check valve 55. A clean-out pipe 57 connects a second nozzle 56 in the sand trap, with the chamber 39 in the sander valve 36.

The operation of the system is as follows: Assuming a sanding operation is desired in connection with a service brake application, the pinch handle 7 is actuated and unseats valve 8. Main reservoir air then flows from pipe 11 through passages 12 and 13 and pipe 15 to the pressure switch 16 closing the electric circuit.

Assuming the manual switch 24 is closed, current will flow as follows: From the source 61, along supply wire 62, branch wires 63 to the windings of the magnet valves, branch wires 64 to the return wire 65, manual switch 24, and pressure switch 16 to the source 61.

If switch 24 is open the circuit will be from source 61 along supply wire 62, branch wires 63 and 64 of the first magnet valve, return wire 65, and pressure switch 16 to the source 61.

It will thus be seen that the effect of actuating switch 24 is to render the entire sanding system active or limit the sanding function to the leading truck only.

Assuming the first-named conditions to exist, all magnet valves 25 will be energized. Their exhaust ports 27 will be closed, and their supply ports 26 will be opened. Main reservoir air will then flow through pipe 33, branch pipe 34, supply port 26, and pipe 35 to the cylinder 38 of the sander valve 36, forcing the piston 45, and necessarily the piston 46, downward.

As downward motion of pistons 45 and 46 is initiated, piston stem 47 unseats poppet valve 43, admitting main reservoir pressure from chamber 42 to the chambers 41 and 39. Flow of air pressure, which momentarily occurs from chamber 39 through clean-out pipe 57 to nozzles 56, is shortly terminated as piston 46 overtravels and blanks the connecting port between chamber 39 and pipe 57.

However main reservoir air continues to flow from chamber 42 through chamber 41 and pipe 54 as long as the poppet valve 43 is open. Ball check valves 55 will be opened thereby and air pressure, flowing through nozzle 53, will eject a stream of sand through discharge pipe 51 and upon the rails.

Upon release of the pinch handle 7 spring 9 will seat valve 8, terminating flow of air to the pressure switch 16. Pressure in switch 16 will quickly bleed down through choke fitting 14 and the electric circuit will be broken. The magnet valves 25 will be deenergized, their supply ports 26 closed, and their exhaust ports 27 opened, exhausting the cylinder 38 of the sander valve 36.

Spring 44 will seat the poppet valve 43, terminating flow of air to the sand traps and thereby terminating the sanding operation. Spring 44 at the same time returns the pistons 45 and 46 to their upper position.

The above described sanding operation is automatically initiated upon movement of the engineer's brake valve handle to emergency position. The slide valve of the triple portion 5b of the control valve 5 will then connect the sanding reservoir 6 with branch pipe 17, and air pressure from that reservoir will flow by way of pipe 17 to pipe 15 and operate pressure switch 16 as before described to cause a sanding function.

If the brake valve handle is held in emergency position the sanding function will continue until the sanding reservoir pressure is bled down through the choke fitting 14, when the pressure switch will act to terminate the sanding function as before described. Thus sanding will continue for a definite time interval unless the brakes are sooner released. Release terminates the sanding through the action of the control valve 5.

What is claimed is:

1. The combination with a train brake system of the high speed type, including a brake pipe and a plurality of braking units connected with said brake pipe and controlled by changes of pressure therein, said units being capable of producing emergency applications; means rendered active as an incident to the initiation of an emergency application of the brakes for furnishing air under pressure; a fluid pressure operable switch arranged to be operated by air under pressure so supplied; a plurality of magnet valves; an electric circuit extending substantially throughout the train and including said switch and the windings of said magnet valves; and sanders controlled by the magnet valves, the various sanders being associated with corresponding braking units throughout the train, the speed of electric response as compared with the speed of development of braking pressure serving to ensure that initiation of an emergency application causes sanding throughout the train, at least as early as the development of effective braking pressure.

2. The combination defined in claim 1 in which the means rendered active as an incident to the initiation of an emergency application comprises a sander port included in a braking unit approximately at the head of the train and arranged to deliver air under pressure to the fluid pressure operable switch as that unit reaches emergency position.

3. The combination with the structure defined in claim 1, of a manually operable valve serving when operated to furnish air under pressure to the fluid pressure operable switch, independently of a brake application.

4. The combination with the structure defined in claim 1, of a switch operable to sub-divide said electric circuit whereby in one position of the switch, the sanders throughout the train will be operative and in another position of the switch, sanders on at least one leading unit will be operative and those on trailing units inoperative.

5. The combination with the structure defined in claim 1, of timing means for limiting the duration of the response of said fluid pressure operated switch, to the air supplied thereto.

6. In a vehicle brake and sanding system, in combination, a train conductor, a plurality of electrically operated sanding devices connected to said conductor and operable when said conductor is energized to effect sanding of the track rails, two independently operable switch devices connected in series between said conductor and a source of current supply, one of said switch devices being normally opened and the other being normally closed, means for effecting the closing of said normally open switch device whenever an application of the train brakes is effected, and means operable independently of the train brake application and of said last means for effecting the opening of said normally closed switch device either before or after a train brake application has been initiated.

CHARLES A. CAMPBELL.